United States Patent [19]
Schrell et al.

[11] Patent Number: 6,001,995
[45] Date of Patent: Dec. 14, 1999

[54] WATER-SOLUBLE ETHERIFIED STARCHES

[75] Inventors: Andreas Schrell, Kriftel; Bernd Huber, Kelheim, both of Germany

[73] Assignee: DyStar Textilfarben GmbH & Co. Deutschland KG, Frankfurt am Main, Germany

[21] Appl. No.: 08/952,771

[22] PCT Filed: May 15, 1996

[86] PCT No.: PCT/EP96/02084

§ 371 Date: Nov. 21, 1997

§ 102(e) Date: Nov. 21, 1997

[87] PCT Pub. No.: WO96/37642

PCT Pub. Date: Nov. 28, 1996

[30] Foreign Application Priority Data

May 24, 1995 [DE] Germany ............ 195 19 023

[51] Int. Cl.⁶ ............ C08B 31/08; C08B 31/12
[52] U.S. Cl. ............ 536/111; 536/124; 536/57
[58] Field of Search ............ 536/57, 111, 124

[56] References Cited

U.S. PATENT DOCUMENTS

| | | | |
|---|---|---|---|
| 2,995,513 | 8/1961 | Paschall et al. | 536/50 |
| 3,066,032 | 11/1962 | Fukushima | 536/57 |
| 3,685,953 | 8/1972 | Cuvelier et al. | 8/115 |
| 3,778,225 | 12/1973 | Cuvelier et al. | 8/542 |
| 3,842,005 | 10/1974 | Moser et al. | 536/50 |
| 4,127,563 | 11/1978 | Rankin et al. | 536/50 |
| 5,565,007 | 10/1996 | Schrell et al. | 8/538 |

FOREIGN PATENT DOCUMENTS

| | | |
|---|---|---|
| 2141267 | 7/1995 | Canada. |
| 0031477 | 7/1981 | European Pat. Off.. |
| 0665311 | 8/1995 | European Pat. Off.. |
| 0683251 | 11/1995 | European Pat. Off.. |
| 1942742 | 3/1970 | Germany. |
| 2131560 | 1/1972 | Germany. |
| 4125752 | 2/1993 | Germany. |
| 4210270 | 9/1993 | Germany. |
| 760008354 | 1/1976 | Japan. |
| 51-121062 | 10/1976 | Japan. |

OTHER PUBLICATIONS

D. B. Solarek, "Cationic Starches", *Modified Starches: Properties and Uses*, 1987, pp. 113–129.

*Primary Examiner*—Gary L. Kunz
*Assistant Examiner*—Everett White
*Attorney, Agent, or Firm*—Connolly Bove Lodge & Hutz LLP

[57] ABSTRACT

Aminated cellulose fiber obtained by adding one or more starches etherified with $C_2$–$C_5$-alkylamines which may additionally be substituted in the alkyl moiety by 1 to 2 further hydroxyl and methoxy groups and whose amino group is a primary or $C_1$–$C_4$-alkyl-substituted secondary, tertiary or quaternary amino or ammonium group and having a degree of substitution between 0.1 and 3 to a viscose dope, an alkali cellulose or a cellulose solution and spinning fiber therefrom.

5 Claims, No Drawings

WATER-SOLUBLE ETHERIFIED STARCHES

Viscose fiber has essentially the same dyeing characteristics as cotton fiber. At present, the dyeing of natural or regenerated cellulosic fiber requires the presence of alkali-donating agents and also electrolytes in order that satisfactory fixation results may be obtained with reactive dyes. However, it is precisely these necessary additions which are ecologically unacceptable. The future will therefore increasingly belong to regenerated cellulose fiber which is first, without additional process steps, converted into modifications having a high dye affinity, i.e. modifications which are dyeable without salt and alkali. Fiber modified in this way resembles animal fiber, such as wool or silk, in its chemical behavior and it can be dyed under neutral conditions with anionic dyes without further salt or alkali additions.

A special field of application in this connection are blend fabrics, for example fabrics composed of blends between polyester and modified viscose, which can then be dyed in a single bath.

Modifications of viscose have already been described in the literature. DE-A-1 948 487 describes a process for producing viscose fiber having novel dyeing properties. The fiber is produced using polyamineamides, which not only severely alter the native character of the fiber but are also responsible for the unsatisfactory fastness level of the subsequent dyeing.

Similarly, DE-A-1 469 062 concerns "aminalized fiber". The additions are aminoethyl- and diethylaminoethyl-celluloses in high concentration, and the dyeing is done exclusively with acid dyes. The disadvantage of this process is that the additions first have to be complicatedly synthesized and isolated and, what is more, are costly.

It is an object of the present invention to produce a viscose fiber having significantly more affinity for both reactive and direct dyes and differing positively from standard fiber in desired performance characteristics too.

This object is surprisingly achieved by admixture to a viscose dope, cellulose solution or alkali cellulose of starch derivatives highly substituted with amino-containing compounds and subsequent spinning.

The present invention accordingly provides aminated regenerated cellulose fiber obtained by adding one or more starches etherified with $C_2$–$C_5$-alkylolamines which may additionally be substituted in the alkyl moiety by 1 to 2 further hydroxyl and methoxy groups and whose amino group is a primary or $C_1$–$C_4$-alkyl-substituted secondary, tertiary or quaternary amino or ammonium group and having a degree of substitution between 0.1 and 3, preferably 0.11 to 2, in particular 0.2 to 1, to a viscose dope, an alkali cellulose or a cellulose solution and spinning fiber therefrom.

The etherified starch derivatives have a degree of substitution between 0.1 and 3. A degree of substitution of 3 means that every one of the three free OH groups in every glucose unit is etherified. A degree of substitution of 0.1 means that, on average, every tenth glucose unit has one etherified OH group.

Starches having a degree of substitution of about 0.05 are known per se (Houben-Weyl, 1987, Vol. E 20, part 3, pages 2135–2151), but starches having a degree of substitution of 0.1 or higher have not been described before.

The present invention therefore also provides above-described alkylamino-etherified starch derivatives having a degree of substitution between 0.1 and 3, preferably 0.11 to 2.

Preference for the purpose of the present invention is given to those starch ethers whose ether group has the formula —O—$(CH_2)_x$—$NR_2$, —O—$CH_2$—CHOH—$CH_2$—$NR_2$, —O—$(CH_2)_x$—$SO_2$—$(CH_2)_y$—$NR_2$, —O—$(CH_2)_x$—$SO_2$—$(CH_2)_y$—$NR^\oplus_3 A^\ominus$, —O—$(CH_2)_x$—$NR^\oplus_3 A^\ominus$ or —O—$CH_2$—CHOH—$CH_2$—$NR^\oplus_3 A^\ominus$, where x and y are each 2 or 3, the R radicals are identical or different and each denote hydrogen, methyl or ethyl, and A is an anion, preferably chloride or sulfate. Particular preference is given to those starch ethers whose ether group has the formula —O—$CH_2CH_2$—$NH_2$, —O—$CH_2$—CHOH—$CH_2$—$N^{61}(CH_3)_3$ or —O—$CH_2CH_2$—$N^\oplus(CH_3)_3$.

The novel starch ethers having said high degree of substitution form fluent to highly viscous materials in water ranging in viscosity from 1 to 30 Pas (about 20% strength by weight aqueous solution), which, in the production of the regenerated cellulose fiber, can be added to the spinning dope, cellulose solution or alkali cellulose without further workup.

The degree of polymerization of the starch ethers of this invention is advantageously between 100 and 1000, preferably ably 100 and 400, anhydroglucose units. If the degree of polymerization were smaller than 100, the starch ether could be washed out of the fiber after spinning.

The starch ethers of this invention are prepared by reacting any desired starch, for example potato starch, maize starch or wheat starch, with a $C_2$–$C_5$-alkylamine having a substituent reactive toward OH groups, for example α-chloro-β-hydroxyl, 1, 2-epoxy, 1-(sulfatoethyl sulfone.) or sulfatoethyl substitution, at a pH of 9 to 14, preferably 9.5 to 13. The reaction temperature is advantageously 40 to 100° C. The $C_2$–$C_5$alkylamine is reacted in a molar ratio of alkylamine:anhydroglucose unit of 0.1:1 to advantageously 4:1, depending on the degree of substitution desired for the starch.

Examples of the aforementioned alkylamines which are used for modifying the starch are glycidyl trimethylammonium sulfate or chloride, sulfatoethyltrimethylammonium sulfate or chloride, aminoethyl sulfate, 3-chloro-2-hydroxypropyltrimethylammonium sulfate or chloride and aminopropyl sulfatoethyl sulfone.

The starch ethers used for producing the aminated regenerated cellulose fiber, being soluble in water, are readily dispersible directly in the spinning dope, preferably in an aqueous medium optionally with the aid of emulsifiers, and exhibit good compatibility with the viscose. The fluent starch ether is added in an amount of 1 to 20%, preferably 1 to 12% by weight, calculated as dry substance, based on the cellulose content of the spinning dope, prior to coagulation and shaping. The filterability of the viscose shows no deterioration compared with addition-free samples, so that no plugging of the spinneret is to be observed in the course of the spinning process. The shaping of the viscose is carried out by customary and known methods, for example by means of spinnerets, a subsequent coagulation bath and optionally further aftertreatment baths.

Another way of producing the aminated regenerated cellulose fiber is to stir the starch derivatives mentioned into the alkali cellulose, a precursor of the viscose. Again, following xanthation and extrusion into an acidic coagulation bath, an aminated viscose fiber is obtained.

The fiber obtained by the methods described can, after processing into wovens and knits, be dyed by various processes, such as exhaust, padding and modern printing processes, such as inkjet processes, without use of salt or alkali.

The present invention also provides a process for producing a dyed or printed textile material composed of regenerated cellulose fiber, which comprises adding said starch ethers to a viscose dope, cellulose solution or alkali cellulose and spinning fiber, for example by the viscose spinning process or from the cellulose solution, processing the fiber into a woven or knitted fabric and dyeing or printing said fabric with one or more reactive dyes in the absence of additional electrolyte salt or alkali.

The textile modified fiber material which is used in the dyeing process of the invention can be present in all processing states, for instance as yarn, staple, slubbing and piece goods (fabrics).

The modified textile materials are dyed according to the present invention analogously to known processes for dyeing and printing fiber materials with water-soluble textile dyes and through the use of the known temperature ranges and customary dye quantities, except that the dyebaths, padding processes, print pastes and inkjet formulations require no addition of alkaline compounds, as customary for fixing fiber-reactive dyes, nor customary additions of electrolyte salts. Dyeing or printing therefore takes place at a pH between 4.5 and 8.5 and, if commercially available reactive or direct dyes are used, in the presence of an electrolyte salt content of 0.01 to 0.5% by weight, based on the dyeing solution. Without the novel amination of the cellulose fiber, this electrolyte content would be too low for successful dyeing by a factor of 20 to 1000.

Suitable dyeing processes for the purposes of this invention include for example the various exhaust processes, such as dyeing on the jigger or on the reel beck or dyeing from long or short liquor, dyeing in jet dyeing machines, dyeing by short-time pad-batch processes or by a pad-superheated steam fixation process. Suitable dyeing processes for the purposes of this invention also include printing techniques, for example inkjet printing and transfer printing.

The dyes which are used for dyeing the modified cellulose are generally anionic in nature. Of particular suitability are the fiber-reactive textile dyes which are capable of reacting with hydroxyl groups, for example of cellulose, or amino and thiol groups, for example of wool and silk, of synthetic polymers, such as polyamides, or else modified polymers, specifically the aminated celluloses, to form a covalent bond. Suitable fiber-reactive components on the textile dyes include in particular sulfatoethylsulfonyl, vinylsulfonyl, chlorotriazinyl, fluorotriazinyl, and also combinations thereof.

Suitable acid or direct dyes for dyeing or printing cellulose fiber modified according to this invention include for example the diamine dyes, ®Sirius Light Fast dyes, ®Alphanol dyes, ®Cotonerol dyes and ®Duasyn dyes, such as, for example, C.I. Acid Black 27 (C.I. No. 26 310), C.I. Acid Black 35 (C.I. No. 26 320), C.I. Acid Blue 113 (C.I. No. 26 360), C.I. Direct Orange 49 (C.I. No. 29 050), C.I. Direct Orange 69 (C.I. No. 29 055), C.I. Direct Yellow 34 (C.I. No. 29 060), C.I. Direct Red 79 (C.I. No. 29 065), C.I. Direct Yellow 67 (C.I. No. 29 080), C.I. Direct Brown 126 (C.I. No. 29 085), C.I. Direct Red 84 (C.I. No. 35 760), C.I. Direct Red 80 (C.I. No. 35 780), C.I. Direct Red 194 (C.I. No. 35 785), C.I. Direct Red 81 (C.I. No. 28 160), C.I. Direct Red 32 (C.I. No. 35 790), C.I. Direct Blue 162 (C.I. No. 35 770), C.I. Direct Blue 159 (C.I. No. 35 775), C.I. Direct Black 162:1 and C.I. Direct Violet 9 (C.I. No. 27 885).

Unless otherwise stated, parts and percentages in the examples which follow are by weight.

The molar masses of the starches used are customarily based on one anhydroglucose unit.

EXAMPLE 1 a) Preparation of the starch ether:

162 g (1 mol) of potato starch, technically dry, are added in a kneader to 500 ml of water in which 26.4 g (0.66 mol) of sodium hydroxide have been dissolved beforehand. Then 130 g (0.6 mol) of 2,3-epoxypropyltrimethylammonium chloride are added as 70% strength solution in water. The mixture is kneaded at 60° C. for 4 hours, cooled down to room temperature and adjusted with sulfuric acid to pH 6. The viscosity is 5.6 Pas at 50° C. and 19.6 Pas at 20° C.

To further characterize the starch derivative, 5 parts of the viscous mass are dissolved in 100 parts of water and freed of unconverted epoxide and neutralization salts by means of a membrane desalting technique. The purified starch derivative is evaporated to dryness under reduced pressure. The degree of substitution is determined via a nitrogen assay of the modified starch. The nitrogen content was 3.5% in the present case. The degree of substitution is calculated according to the following formulae:

$$162 + 151/14 \times [\%N] = MW$$

$$[\%N]/14 \times MW : 100 = [\text{degree of substitution}]$$

The modified starch accordingly has a degree of substitution of 0.67.

b) The starch derivative thus obtained is incorporated into a plant-customary fiber-grade viscose having a cellulose content of 8.9%, an alkali content of 5% and a viscosity at 30° C. of 38 falling-ball seconds as follows: 50 parts of the modified starch are mixed with 436 parts of fiber-grade viscose. This premix is stirred into 2522 parts of fiber-grade viscose.

After devolatilization the spinning dope is spun by plant-customary viscose spinning processes into a bath comprising sulfuric acid, sodium sulfate and zinc sulfate to form fiber, which is stretched in acidic baths, cut, washed, spin finished and dried.

c) 10 parts of this dry viscose fiber is then admixed in a dyeing apparatus with 100 parts of water. The temperature is raised to 60° C. and a total of 0.1 part of a 50% strength electrolyte(predominantly sodium chloride)—containing dye powder of formula, known from DE-A-1 943 904

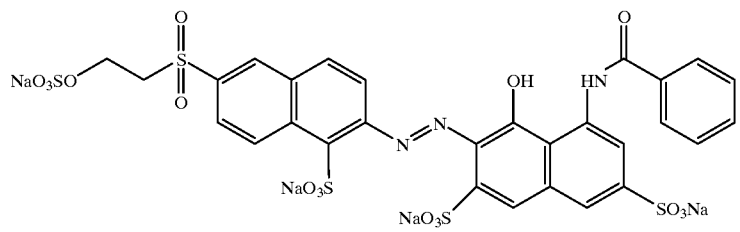

is metered in over a period of 30 minutes. Following a further liquor circulation period of 5 min the remaining, almost colorless liquor is dropped and the material is conventionally washed out and dried. The result obtained is a strong, deep red dyeing having very good use fastness properties.

EXAMPLE 2

10 parts of the viscose fiber modified as described in Example 1 are transferred into a dyeing apparatus and treated in a liquor ratio of 10:1 with an aqueous liquor which, based on the weight of dry fiber, includes 0.1 part of a reactive dye of the formula, known from Example 106 of EP-A-0 457 715

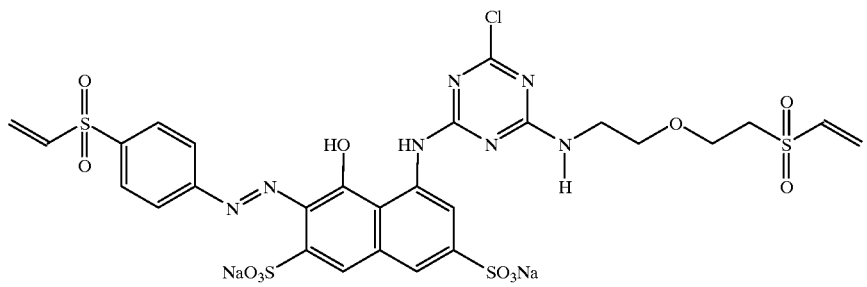

in solution. The fiber is dyed at 60° C. for 30 minutes. The dyeing thus produced is further treated by rinsing and soaping in a conventional manner. The result obtained is a deep red dyeing having very good use fastness properties.

EXAMPLE 3

A fiber-grade viscose as described in Example 1 is admixed with a starch synthesized according to the following description:

200 g (1.2 mol) of maize starch are added in a 2 l flask fitted with a downward-moving stirrer to 500 ml of water and 24 g (0.6 mol) of sodium hydroxide. 113 g (0.4 mol) of sulfatoethyltrimethylammonium sulfate, dissolved in 300 ml of water, are then added to the mixture. The resulting mixture is stirred at 85° C. for 6 hours, if necessary kept stirrable by further addition of water, cooled down to room temperature and adjusted with sulfuric acid to pH 6. The starch ether has a degree of substitution of 0.3.

The product is stirred into the viscose as described under Example 1. Following devolatilization the spinning dope is spun by plant-customary viscose spinning processes into a bath comprising sulfuric acid, sodium sulfate and zinc sulfate to form fiber, which is stretched in acidic baths, cut, washed, spin finished and dried.

Weaving thus gives a textile viscose fabric which can be further processed directly in a pad-dyeing process. For this the fabric has applied to it at 25° C., by means of a pad-mangle, an aqueous dye solution which, per 1000 parts by volume, includes in solution 20 parts of the dye of the formula

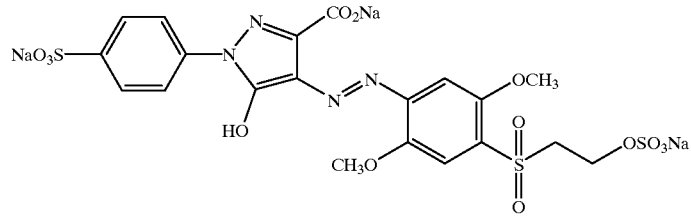

known from Example 1 of EP-A-0 158 233, and 3 parts of a commercial nonionic wetting agent, to a liquor pickup of 80%, based on weight of fiber. The fabric padded with the dye solution was wound onto a batching roller, wrapped in plastic film, left for 4 hours at from 40 to 50° C. and then rinsed with cold and hot water, which may contain a commercial surfactant, and if necessary subsequently rinsed once more with cold water and dried. The result obtained is a strong level yellow dyeing which has good allround fastness properties, especially good rub and light fastness properties.

EXAMPLE 4

A modified fiber-grade viscose described as under Example 1 is spun by the process steps customary for fiber-grade viscoses to form a fiber, which is reactive-dyed in an exhaust process without added salt or alkali. To this end, 30 parts of the viscose fiber are wound on a package and the yarn is treated in a yarn dyeing apparatus which contains 450 parts, based on weight of fiber, of a liquor which contains 0.6 part, based on the initial weight of the goods, of an electrolyte (predominantly sodium chloride)—containing dye of the formula known from Example 1 of DE-A-2 840 380

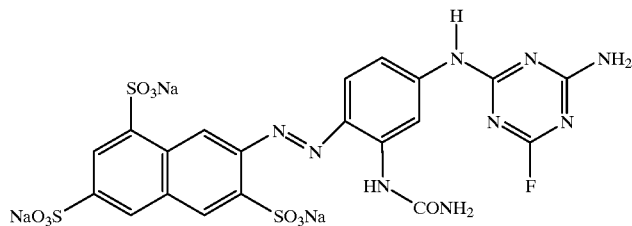

and heated to 60° C., the liquor being pumped alternately in to out and out to in. After 60 min at this temperature the liquor is dropped, and the dyeing obtained is rinsed and washed under the customary conditions. The result obtained is a level yellow fiber having the generally good fastness properties of reactive dyes.

Further Preparation Examples 5–7 for modified starch ethers

In each case 162 g of potato starch are added to 500 ml of water and 26.4 g of sodium hydroxide similarly to Example 1. This mixture is in each case admixed with the following modifiers and further processed and assayed for their degree of substitution as in Example 1:

5) Aminopropyl Sulfatoethyl Sulfone of the Formula

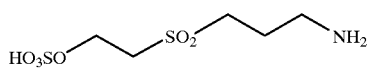

Degree of substitution: 0.26.
6) 3-Chloro-2-hydroxypropyltrimethylammonium chloride Degree of Substitution: 0.35.
7) Aminoethylsulfuric acid Degree of Substitution: 0.31
Examples of Dyeings with Direct Dyes:

EXAMPLE 8

Example 1 is repeated to obtain, on weaving, a textile viscose fabric which can be further processed directly in a pad-dyeing process. For this, the fabric has applied to it at 25° C., by means of a pad-mangle, a dye solution which, per 1000 parts by volume, includes 20 parts of the acid dye of the formula

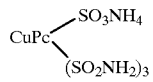

(Pc—phthalocyanine)

(C.I. Direct Blue 199) and 3 parts of a commercial nonionic wetting agent, to a liquor pickup of 80%, based on weight of fiber. The dye solution has beforehand been adjusted to pH 5 with acetic acid. The fabric padded with the dye solution is then steamed for 2 minutes. The dyeing thus produced is further treated by rinsing and soaping in a conventional manner. The result obtained is a strong turquoise dyeing having very good allround fastness properties.

EXAMPLE 9

A viscose modified as in Example 3 is passed by means of one or two rolls for guiding and tensioning the fabric underneath an inkjet printing head and printed with aqueous solutions of direct dyes. To obtain multicolored prints, a four-color print is carried out with the primary colors of subtractive color mixing (yellow, cyan, magenta and black). The cyan dye used was C.I. Blue 199, the yellow dye used was C.I. Direct Yellow 34 (C.I. No. 29060), the magenta dye used was C.I. Direct Red 79 (C.I. No. 29065), and the black component used was C.I. Direct Black 162:1. The printer operates according to the drop on demand process and the ink droplet is created thermally (bubblejet process). The printed fabric is subsequently steamed for 2 minutes and then conventionally rinsed and soaped. The resulting print has good allround fastness properties.

EXAMPLE 10

Example 6 is repeated, the viscose worked up and the fiber woven up.

A viscose modified in this way is applied to a rotating roll. A continuous-flow printing head then issues a continuous stream of droplets of direct dye which, under computer control, reach the viscose or are deflected. To obtain multicolor prints, a four-color print is carried out with the primary colors of subtractive color mixing (yellow, cyan, magenta and black). The cyan dye used is C.I. Blue 199, the yellow dye used is C.I. Direct Yellow 34, the magenta dye used is C.I. Direct Red 81 and the black component used is C.I. Acid Black 35. The printed fabric is subsequently steamed for 2 minutes and then conventionally rinsed and soaped. The resulting print has good allround fastness properties.

EXAMPLE 11

A viscose fiber produced according to Example 1 is converted into a woven fabric following further processing by the process steps customary for viscose fiber and dyed.

For this, the fabric is guided by means of two rolls for guiding and tensioning the fabric underneath an inkjet printing head and printed with aqueous solutions of direct dyes. The printer operates according to the drop on demand process and the ink droplet is generated by the piezo principle. To obtain multicolor prints, a four-color print is carried out with the primary colors of subtractive color mixing (yellow, cyan, magenta and black). The cyan dye used is C.I. Blue 199, the yellow dye used is C.I. Direct Yellow 67, the magenta dye used is C.I. Direct Red 81 and the black component used is C.I. Acid Black 27. The printed fabric is subsequently steamed for 2 minutes and then conventionally rinsed and soaped. The resulting print has good allround fastness properties.

FURTHER EXAMPLES

Example 1 is repeated with similar results using the below-listed dyes:

| | |
|---|---|
| C.I. Direct Violet 9 | C.I. No. 27885 |
| C.I. Direct Brown 126 | C.I. No. 29085 |

| | |
|---|---|
| C.I. Direct Orange 69 | C.I. No. 29055 |
| C.I. Acid Blue 113 | C.I. No. 26360 |
| C.I. Acid Blue 40 | C.I. No. 62125 |

What is claimed is:

1. A water-soluble etherified starch, the ether substituents being groups of the formula $-O-(CH_2)_x-SO_2-(CH_2)_y-{}^{(+)}NR_3A^{(-)}$ wherein x and y are each 2 or 3, and the R-radicals are identical to one another or different from one another and each denotes hydrogen, methyl or ethyl, and $A^-$ is an anion.

2. The water-soluble etherified starch according to claim 1, wherein said etherified starch has a degree of substitution between 0.11 and 2.

3. The water-soluble etherified starch according to claim 1, where the degree of polymerization of the etherified starch is between 100 and 1000 anhydroglycose units.

4. The water-soluble etherified starch according to claim 3, where the degree of polymerization is between 100 and 400 anhydroglucose units.

5. The etherified starch of claim 1, wherein $A^\ominus$ is chloride or one equivalent of sulfate.

* * * * *